_United States Patent_ [19]

Smemo

[11] 4,178,813
[45] Dec. 18, 1979

[54] SPLIT INPUT PLANETARY TRANSMISSION
[75] Inventor: Alfred S. Smemo, Dubuque, Iowa
[73] Assignee: Deere & Company, Moline, Ill.
[21] Appl. No.: 762,587
[22] Filed: Jan. 26, 1977
[51] Int. Cl.² ............................................. F16H 57/10
[52] U.S. Cl. ........................................ 74/764; 74/765; 74/740; 74/753; 74/758
[58] Field of Search ................. 74/758, 753, 740, 764, 74/765

[56] References Cited
U.S. PATENT DOCUMENTS

| | | | |
|---|---|---|---|
| 658,620 | 9/1900 | Clarke et al. | 74/764 |
| 3,863,524 | 2/1975 | Mori et al. | 74/765 |
| 3,877,320 | 4/1975 | Iijima | 74/753 |
| 3,941,013 | 3/1976 | Miller | 74/740 |
| 3,946,623 | 3/1976 | Murakami et al. | 74/764 |

Primary Examiner—Benjamin W. Wyche
Assistant Examiner—Jim Yates

[57] ABSTRACT

A planetary transmission of a vehicle drive train comprises an input section including three planetary gear sets and three brakes that are selectively operable to condition the three gear sets for respectively establishing a forward converter drive, a reverse converter drive and a direct drive at an output shaft of the input section. The planetary transmission further comprises an output or range section coupled to the output of the input section. The output section includes three planetary gear sets connected together so as to form a three-stage planetary set and three brakes are respectively associated with the three gear sets and selectively operable to control the three gear sets such that low, intermediate and high output speeds are established for every input to the output section with drive torque being delivered by all three gear sets for low speed operation, by two gear sets for intermediate speed operation and by a single gear set for high speed operation.

3 Claims, 10 Drawing Figures

4,178,813

SPLIT INPUT PLANETARY TRANSMISSION

BACKGROUND OF THE INVENTION

The present invention relates to a planetary transmission for use in a vehicle drive train and more particularly relates to a transmission designed for receiving an input either directly from a prime mover or from a torque converter located between the prime mover and the transmission.

Heretofore, the advantages of providing planetary transmissions capable of being driven from the output of a torque converter for low speed, high torque operation and for being driven directly from the output of a prime mover for high speed, low torque operation have been known. However, the known transmissions have not been designed such as to minimize the loads transferred by the gears of the planetary sets thus resulting in gear and housing sizes being larger than necessary.

SUMMARY OF THE INVENTION

According to the present invention, there is provided a novel planetary transmission of the type having direct and converter drive input shafts respectively adapted for connection to the outputs of a prime mover and a hydraulic torque converter. The transmission of the present invention comprises input and output sections with the input section including a first planetary gear set having a sun gear fixed for rotation with the converter drive input shaft and a ring gear controllable by means of a forward converter drive brake; and including a second planetary gear set having a ring gear fixed for rotation with the direct drive input shaft and a sun gear controllable by means of a direct drive brake. Also, associated with the first planetary gear set is reverse drive gearing controllable by means of a reverse converter drive brake. A single carrier supports the planet gears of the first and second gear sets. The output section of the transmission includes first, second and third planetary gear sets and the single carrier supporting the planet gears of the gear sets of the first section also supports the planet gear of the first gear set and transmits the input drive to the output section. The sun gears of each of the gear sets is fixed to an output shaft and the carriers of the second and third gear sets are respectively connected for being driven by the ring gears of the first and second gear sets. High, intermediate and low speed control brakes are respectively coupled to the ring gears of the first, second and third gear sets for selectively braking the same to establish a high speed drive condition, wherein only the first gear set delivers torque, an intermediate speed drive condition wherein the first and second gear sets deliver torque, and a low speed drive condition, wherein all three gear sets deliver torque.

A broad object of the invention is to provide a novel planetary transmission of the split input type wherein the torque loads borne by the planetary gear sets are minimized.

A more specific object of the invention is to provide a planetary transmission having a plurality of planetary gear sets connected together and controlled such that at least for low and intermediate speed conditions the drive torque load is shared by the gears of at least two of the planetary gear sets.

Another object is to provide a planetary transmission of the aforedescribed type that is controlled entirely by brakes.

Yet another object is to provide a planetary transmission wherein a carrier member is used to transmit selected converter or direct drive rotation from an input to an output or range section of the transmission.

These and other objects will become apparent from a reading of the following description together with the appended drawings.

DESCRIPTION OF THE PREFERRED EMBODIMENT

Figure 1:
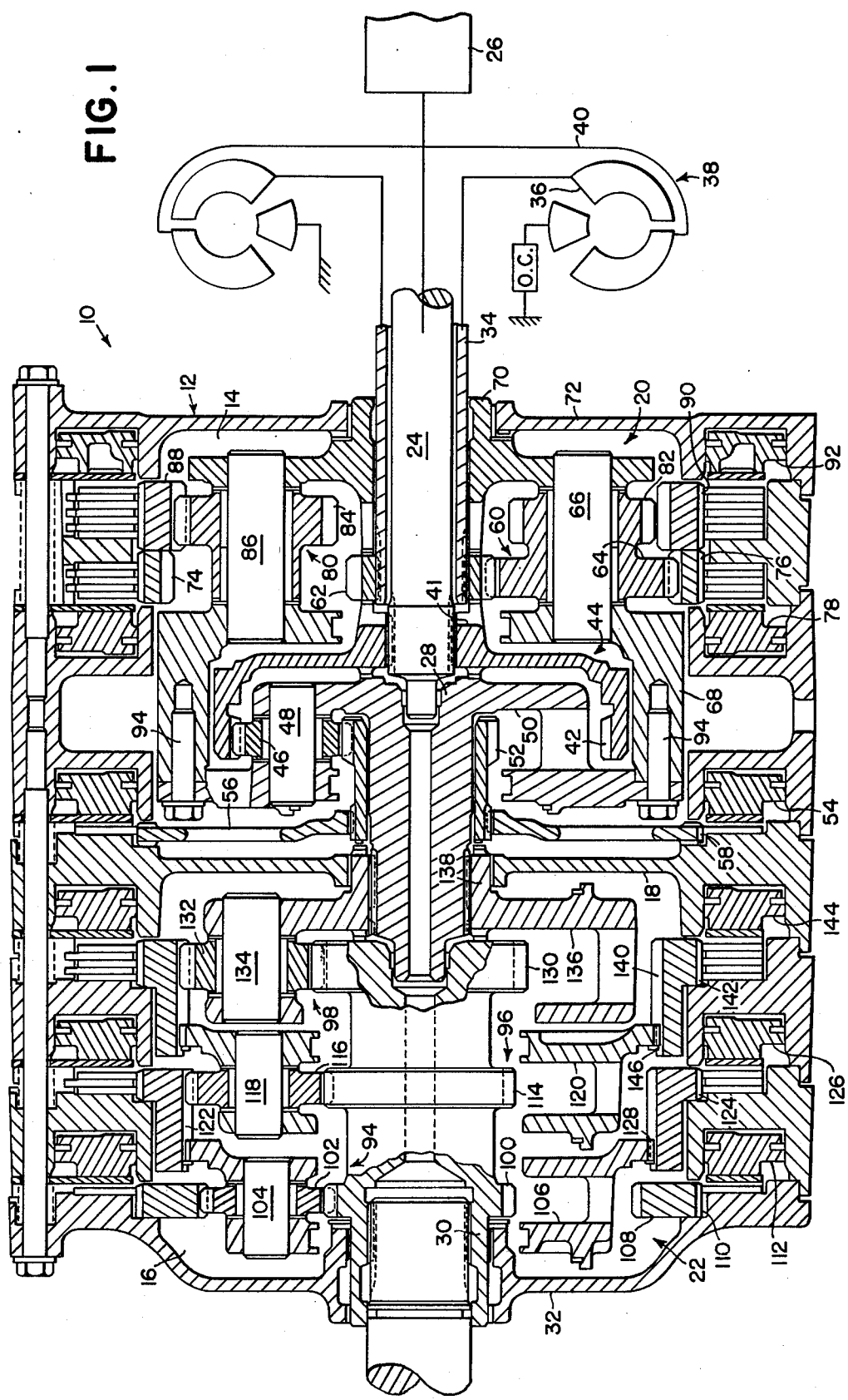
FIG. 1 is a longitudinal sectional view of a planetary transmission constructed according to the present invention and shown in conjunction with a schematically represented prime mover and torque converter.
Figure 2:
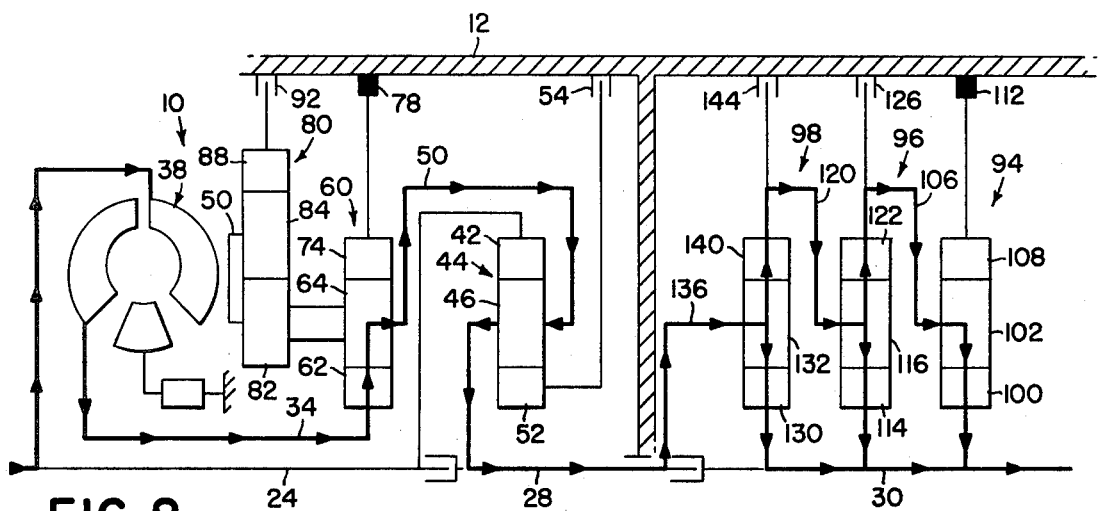
FIGS. 2–10 are schematic respresentations showing the power path for different operating conditions, the lines being shown in heavy and broken directional lines to respectively indicate the forward and reverse directions of rotation of the components involved.
Figure 3:
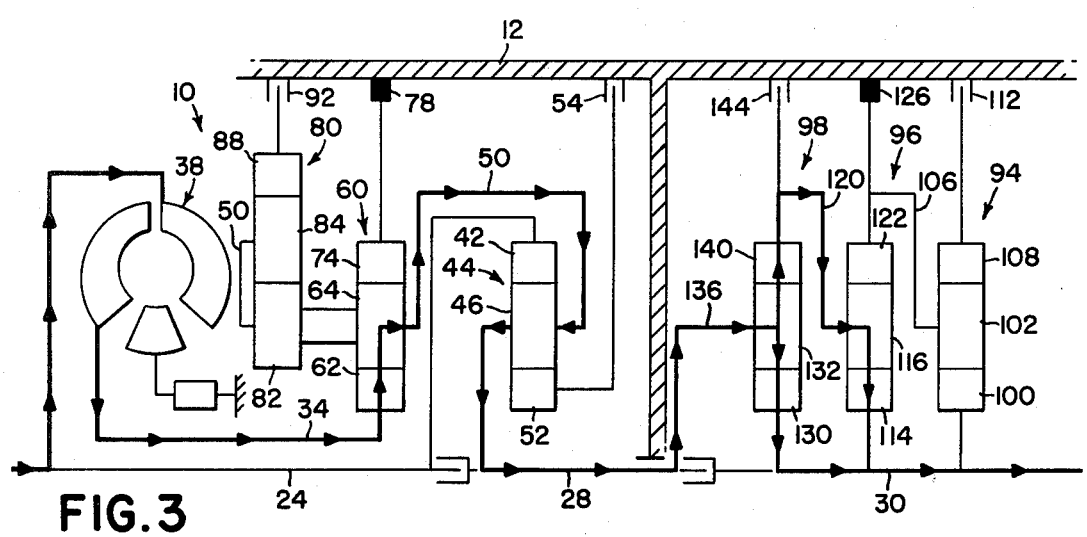
Figure 4:
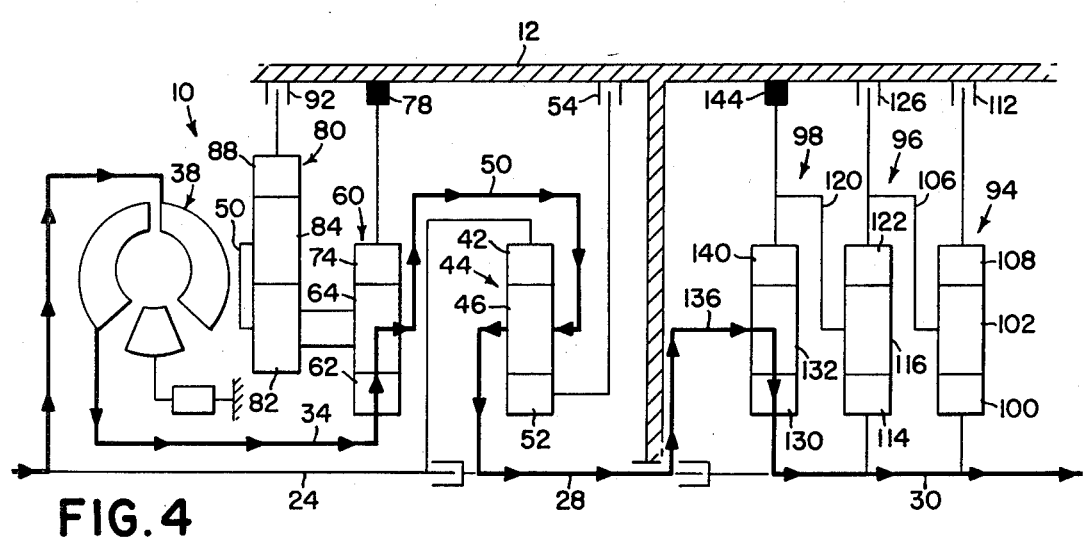
Figure 5:
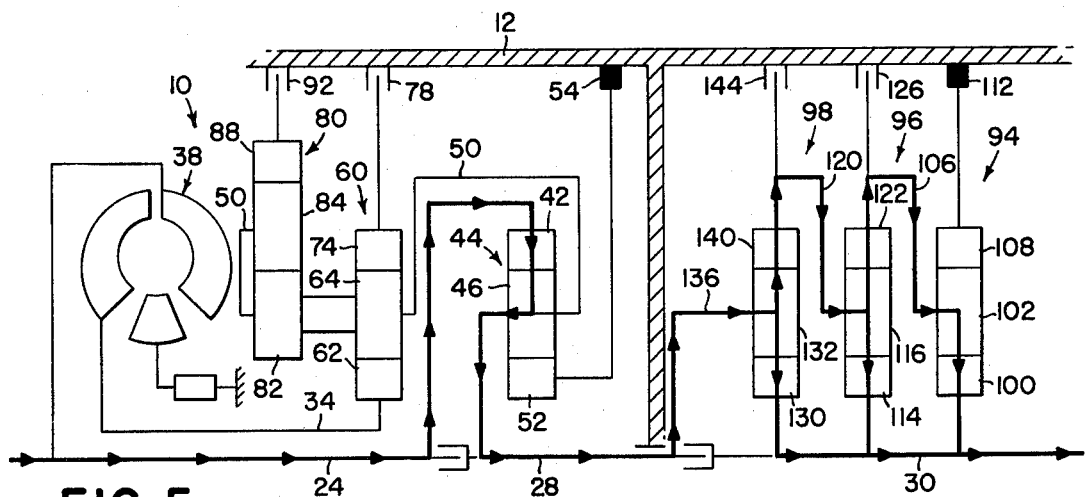
Figure 6:
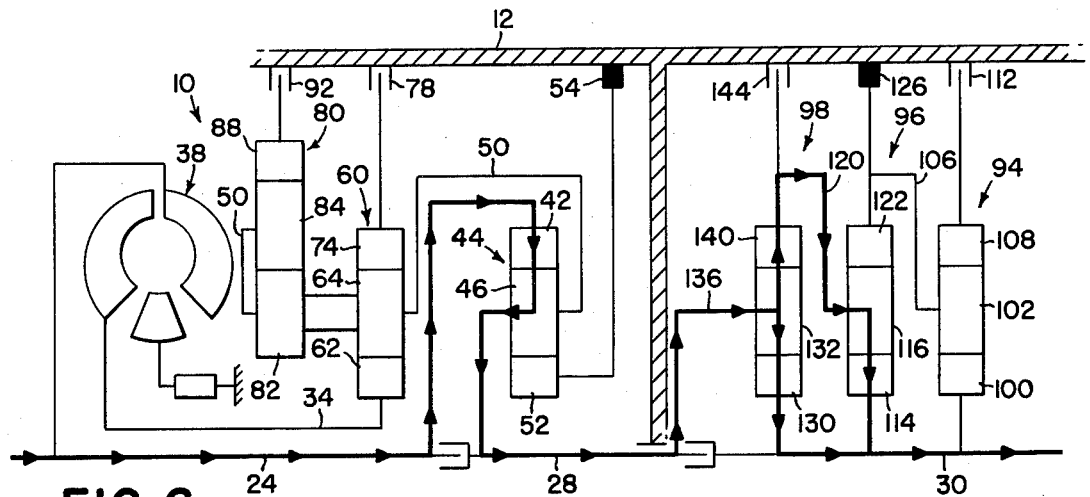
Figure 7:
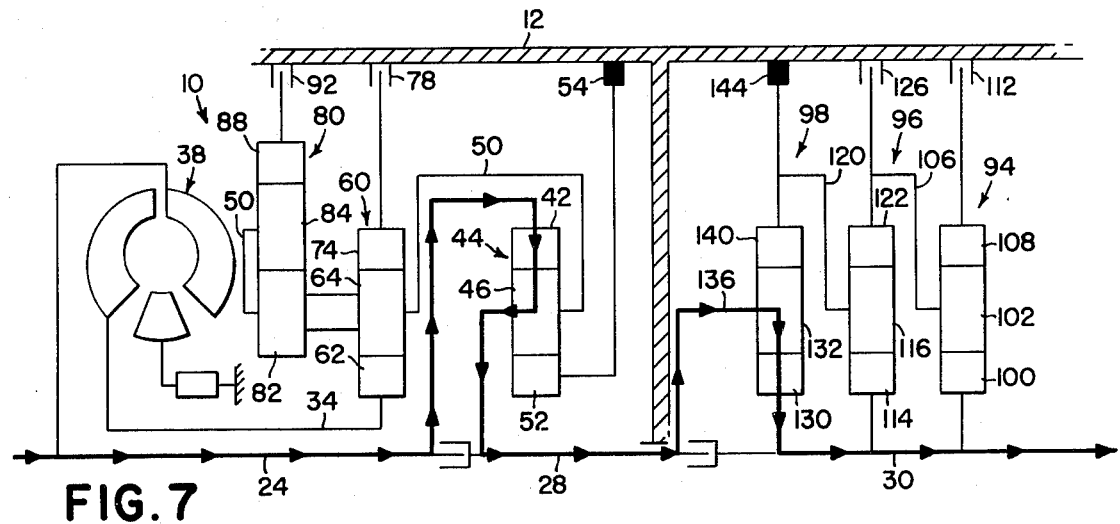
Figure 8:
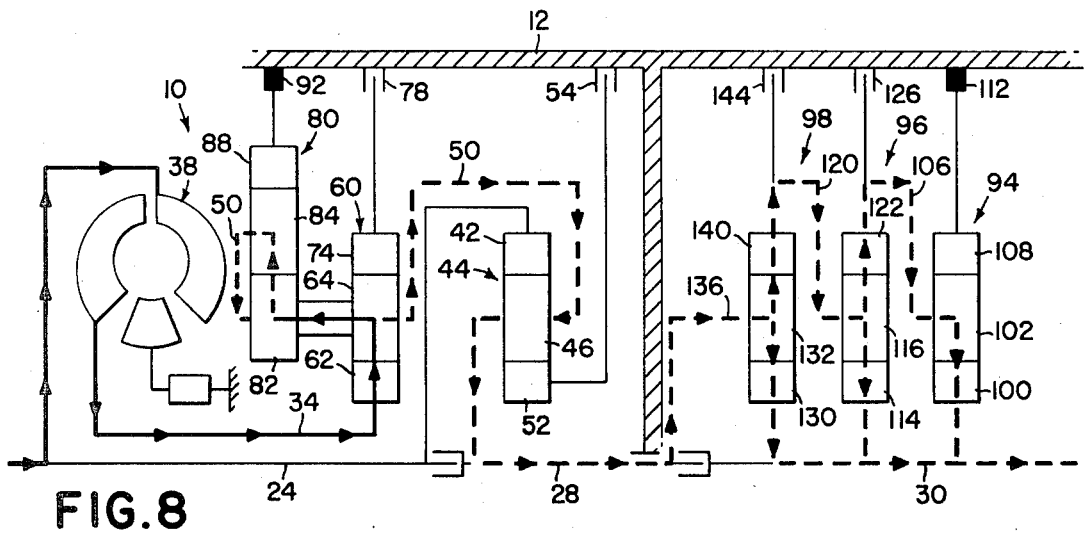
Figure 9:
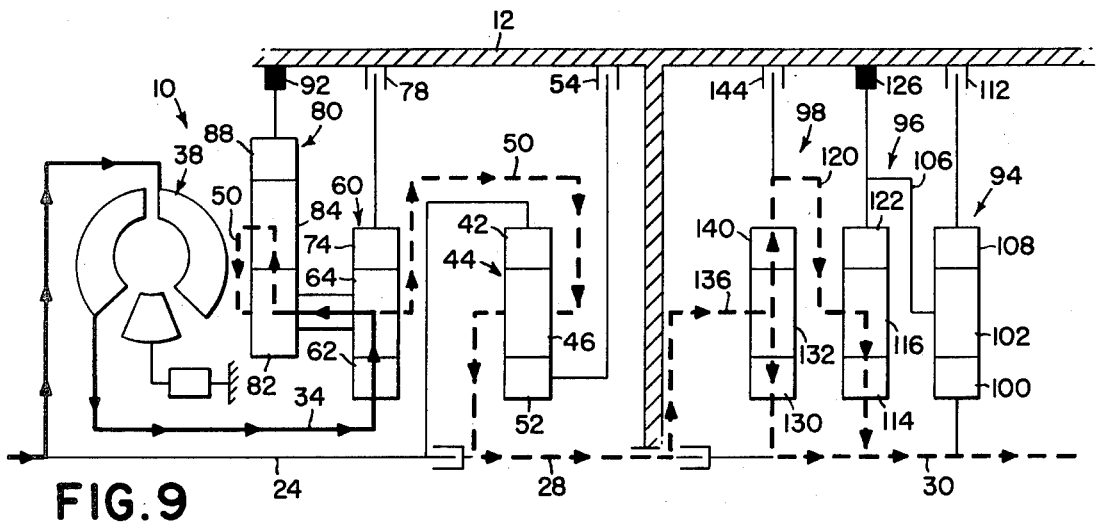
Figure 10:
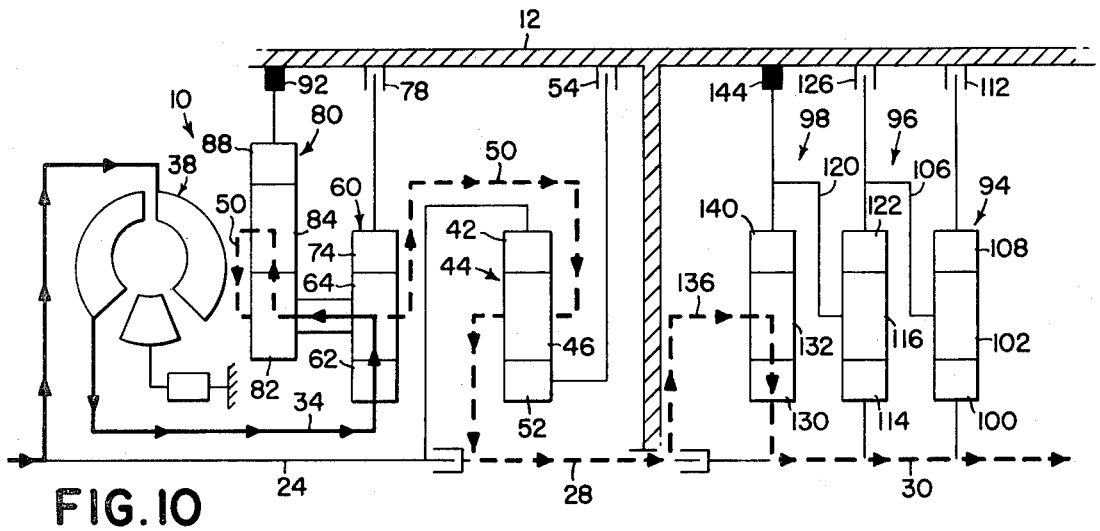

Referring now to FIG. 1, therein is shown a planetary transmission indicated in its entirety by the reference numeral 10. The transmission 10 comprises a housing 12 divided into front and rear gear boxes 14 and 16, respectively, by a vertical partition or wall 18, with the gear box 14 containing components defining an input section 20 of the transmission and with the gear box 16 containing components defining an output or range section 22 of the transmission.

A direct drive input shaft 24 projects into the gear box 14 and has its right and left ends respectively connected directly to an output shaft of a prime mover 26 and rotatably supported in the left end of an intermediate shaft section 28 extending through the wall 18 into the gear box 14. The left end of the shaft section 28 is, in turn, rotatably supported in the right end of a transmission output shaft 30 having its left end rotatably supported in an end wall 32 of the gear box 14.

Arranged concentrically relative to and having the shaft 24 located therewithin is a torque converter drive input shaft 34 which is coupled to be driven by an output turbine 36 of a hydraulic torque converter 38, the latter having an impeller 40 fixed for rotation with the shaft 24.

Received on a splined portion of the shaft 24 adjacent the left end of the latter is a hub 41 of an internal ring gear 42 forming part of a direct drive planetary gear set 44 and having teeth meshed with teeth of a plurality of equiangularly spaced planet gears 46 (only one shown) journalled on respective pins 48 fixed in a carrier 50 formed integrally with the right end of the intermediate shaft 28. Rotatably mounted on the shaft 28 and having teeth meshed with the planet gears 46 is a sun gear 52. A direct drive brake 54 is mounted in the housing 12 and is operatively connected through its plates to a disc-shaped member 56 formed integrally with the sun gear 52 and having teeth 58 carrying the brake plates.

Also forming part of the input section 20 of the transmission is a converter drive input planetary gear set 60 comprising a sun gear 62 received on splines formed on a left end portion of the shaft 34 and meshed with a plurality of equiangularly spaced planet gears 64 (only one shown) rotatably mounted on pins 66 fixed in a carrier 68 having a hub portion 70 rotatably supported in an end wall 72 of the gear housing 12. The planet gears 64 are meshed with an internal annular ring gear 74, the latter having external teeth 76 carrying plates of a converter drive input control brake 78 mounted in the housing 12.

Located beside the converter drive input planetary gear set is an input drive reverser gear set 80 comprising gears 82 formed integrally with the gears 64 such as to define cluster gears mounted on the pins 66. The gears 82 are respectively meshed with equiangularly spaced planet gears 84 (only one shown) rotatably mounted on pins 86 fixed in the carrier 68 and meshed with an internal annular ring gear 88 having external teeth 90 carrying plates of a reverse drive control brake 92 mounted in the housing 12. It is herenoted that the carrier 68 is connected to the carrier 50 by a plurality (only two shown) of cap screws 94 so that through the actuation of the reverse drive control brake 92 a reverse converter input drive will be transmitted to the intermediate shaft section 28, in a manner hereinafter described.

The transmission input section 20, described hereinabove, operates as follows. Power flows to the transmission 10 from the engine 26 directly to the shaft 24 and to the shaft 34 by way of the torque converter 38. When none of the brakes 54, 78 or 92 are actuated, all of the gear sets 44, 60, and 80 of the input section 20 idle and no torque is delivered to the intermediate shaft section 28.

If it is desired to establish a direct forward drive condition in the transmission 10, the direct drive control brake 54 is actuated. The brake 54 then acts to hold the sun gear 52 stationary. This causes carrier 50, and consequently carrier 68, and the intermediate shaft section 28 to rotate in a forward direction. Power flow is then from the ring gear 42 to the planet gears 46, then to carrier 50 and subsequently through the intermediate shaft section 28. As brakes 78 and 92 are not applied, there is no reaction at the ring gears 76 and 90, and gear sets 60 and 80 idle.

A converter forward drive may be established by actuation of the converter drive control brake 78 so as to hold the ring gear 76 stationary. This causes the carrier 68, and consequently the carrier 50 and intermediate shaft section 28 to rotate in a forward direction. Power flow is then from the sun gear 62 to the planet gears 64, then to carrier 68 and subsequently through the carrier 50 and intermediate shaft section 28. As brake 54 is not applied, there is no reaction at sun gear 52, and planetary gear set 44 idles.

A converter reverse drive may be established by actuation of the reverse drive control brake 92 so as to hold the ring gear 90 stationary. This causes the carrier 68, and consequently the carrier 50 and intermediate shaft section 28, to rotate in a backward direction. Power flow is then from the sun gear 62 to planet gears 64, 82 and 84, then to carrier 68 and subsequently through carrier 50 to the intermediate shaft section 28. Again, brake 54 is not applied, and, thus, the planetary gear set 44 again idles.

It is herenoted that the ratios of the gear sets 44, 60 and 80 are chosen such that the intermediate shaft section 28 is driven slower in forward converter drive than it is in direct drive and that it is driven slightly faster in reverse converter drive than it is in forward converter drive.

Thus, it will be appreciated that the intermediate shaft section 28 provides the input to the output or range speed section 22 of the transmission 10. Located serially within the rear gear box 16 as considered moving rightwardly from the end wall 32 are a low speed planetary gear set 94, and intermediate speed planetary gear set 96 and a high speed planetary gear set 98.

Specifically, the gear set 94 includes a sun gear 100 formed integrally with the output shaft section 30 and meshed with a plurality (only one shown) of equiangularly spaced planet gears 102 rotatably mounted on pins 104 fixed in a carrier 106. The planet gears 102 are meshed with an internal ring gear 108 having teeth 110 supporting plates of a low speed control brake 112 mounted in the housing 12.

Similarly, the gear set 96 includes a sun gear 114 formed integrally with the shaft section 30 and meshed with a plurality (only one shown) of equiangularly spaced planet gears 116 rotatably mounted on pins 118 fixed in a carrier 120. The planet gears 116 are meshed with an internal ring gear 122 having teeth 124 supporting plates of an intermediate speed control brake 126. It is herenoted that the ring gear 122 extends toward the low speed gear set 94 and is meshed with teeth 128 formed on the carrier 106 of the gear set 94.

Finally, the gear set 98 includes a sun gear 130 also formed integrally with the shaft section 30 and meshed with a plurality (only one shown) of planet gears 132 rotatably mounted on pins 134 fixed in a carrier 136 having a hub 138 rotatably supported in the wall 18 and received on a splined right end portion of the intermediate shaft section 28. The planet gears 132 are meshed with an internal ring gear 140 having teeth 142 supporting plates of a high speed control brake 144 mounted in the housing 12. The ring gear 140 extends toward the gear set 96 and is meshed with teeth 146 provided on the carrier 120.

The ratios of the gears of the gear sets 94, 96 and 98 are such and the gear sets are related to each other such that the brakes 112, 126 and 144 may be selectively successively actuated to respectively establish low, intermediate and high operating speeds at the output shaft section 30 for every input speed delivered to the transmission output section 22 by the intermediate shaft section 28.

Specifically, to establish a low speed condition in the output section 22 of the transmission, the low speed control brake 112 is actuated to prevent the ring gear 110 from rotating. Power delivered to the carrier 136 by the intermediate shaft section 28 then separates at the planet gears 132 with part of the power exiting to the output shaft section 30 via the sun gear 130 and with the remainder of the power passing on to the ring gear 140 and then to the carrier 120. At this point, the remainder of the power separates at the planet gears 116 with part exiting to the shaft section 30 via the sun gear 114 and with part passing on to the ring gear 122 from where it exits to the shaft section 30 via the carrier 106, planet gears 102 and sun gear 100. It is herenoted that the ratios of the gears of the gear sets 94, 96 and 98, for one design of the invention, are such that, during low speed operation, approximately 46% of the input power is delivered to the shaft section 30 via the gear set 98, approximately 31% of the input power is delivered to the shaft section 30 via the gear set 96 and the remaining 23% of the input power is delivered via the gear set 94. Thus, it will be appreciated that since the delivery of power is shared in this manner by the gear sets 94, 96 and 98 the gear sets can be composed of relatively small gears.

To establish an intermediate speed condition in the output section 22 of the transmission, the intermediate speed control brake 126 is actuated to prevent the ring gear 122 from rotating. Power delivered to the carrier 136 by the intermediate shaft section 28 is then again separated at the planet gears 132 with part of the power exiting to the output shaft section 30 via the sun gear 130 and with the remainder of the power passing on to the ring gear 140 and then to the carrier 120 from where it exits to the output shaft section 30 via the planet gears 116 and sun gear 114. Gear set 94 idles as no power is delivered thereto with the ring gear 122 being fixed. It is herenoted that for the same design of the invention described in the immediately preceding paragraph, approximately 61% of the input power is delivered to the shaft section 30 via the gear set 98 with the remaining 39% being delivered to the shaft section 30 via the gear set 96.

To establish a high speed condition in the output section 22 of the transmission, the high speed control brake 144 is actuated to prevent the ring gear 136 from rotating. With the ring gear 136 fixed, power flows from the shaft section 28 to the carrier 136 and then to the shaft section 30 via the planet gears 132 and sun gear 130. Gear sets 96 and 94 idle as no power is delivered thereto with the ring gear 136 being fixed.

It is herenoted that the speed at which the intermediate shaft section 28 is driven when coupled for being driven directly by the engine 26 is sufficiently greater than the speed at which the shaft section 28 is driven when coupled for being driven by means of the torque converter 38 that the lowest operating speed possible at the output shaft section 30 during direct drive operation of the transmission 10 is greater than the highest operating speed possible at the output shaft section during converter drive operation of the transmission. Thus, the transmission may be operated in first, second or third "gears" forward during converter drive operation and may be operated in fourth, fifth or sixth "gears" during direct drive operation. First, second and third "gears" reverse are also possible during converter drive operation. The power flow paths through the transmission 10 respectively for first through sixth gears forward and first through third gears reverse are respectively illustrated in FIGS. 2-10 of the drawings.

I claim:

1. A planetary transmission comprising: an input section, including a reversible planetary drive adapted for connection to a prime mover, an output section and an intermediate drive shaft coupled between said input and output sections; said output section including an output shaft coaxially aligned with and positioned adjacent to the intermediate drive shaft; low, intermediate and high speed planetary gear sets; each gear set including a sun and ring gear meshed with a plurality of planet gears; each sun gear being coupled for rotation with the output shaft; each gear set including a brake coupled to its ring gear and selectively operable for preventing rotation of the ring gear; and each gear set further including a planet carrier with the planet carrier of the low speed planetary gear set being coupled for rotation with the ring gear of the intermediate speed planetary gear set, with the planet carrier of the intermediate speed planetary gear set being coupled for rotation with the ring gear of the high speed planetary gear set and with the planet carrier of the high speed gear set being coupled for rotation with the intermediate shaft.

2. The power transmission defined in claim 1 wherein said input section includes a direct drive shaft adapted for direct connection to an engine output shaft; a converter drive shaft adapted for connection to a torque converter output element; direct drive and converter drive planetary gear sets; each of the last-mentioned gear sets including a sun gear, a ring gear, and a plurality of planetary gears mounted upon a rotatable carrier and engaged with the ring gear and the sun gear; the sun gear and carrier of the direct drive planetary gear set being respectively rotatably mounted on and fixed for rotation with the input shaft; the ring gear of the direct drive planetary gear set being fixed for rotation with the direct drive shaft, the sun gear of the converter drive planetary gear set being fixed on the converter drive shaft for rotation therewith; the carriers of the direct and converter drive planetary gear sets being fixed for rotation with each other; and selectively engageable direct and converter drive control brakes connected to the housing and respectively connected to the sun gear of the direct drive planetary gear set and to the ring gear of the converter drive planetary gear set, whereby engagement of the direct drive control brake will effect torque transfer from the direct drive shaft to the input shaft via the direct drive planetary gear set and engagement of the converter drive control brake will effect troque transfer from the converter drive shaft to the input shaft via the converter drive planetary gear set.

3. The power transmission defined in claim 2 and further including a reverse planetary gear set including a first set of planetary gears respectively fixed to and adapted for rotation with the planetary gears of the converter drive planetary gear set, a second set of planetary gears engaged with the first set and mounted upon the carrier of the converter drive planetary gear set and a rotatable ring gear engaged with the second set of planetary gears; and a selectively engageable reverse control brake connected between the housing and the last-mentioned ring gear whereby engagement of the reverse control brake will effect torque transfer from the converter drive shaft to the input shaft via the reverse planetary gear set and the converter drive planetary gear set.

* * * * *